C. R. TEIGE & A. L. HART.
AUTOMATIC INDICATOR FOR PLATE HOLDERS.
APPLICATION FILED DEC. 17, 1914.
1,143,462. Patented June 15, 1915.
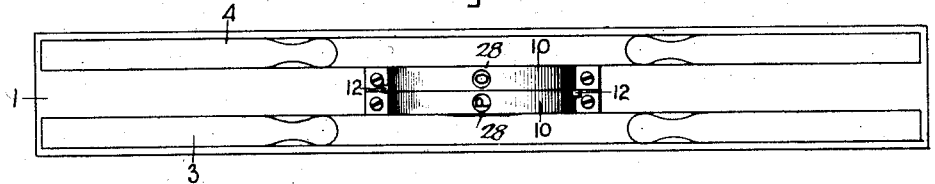
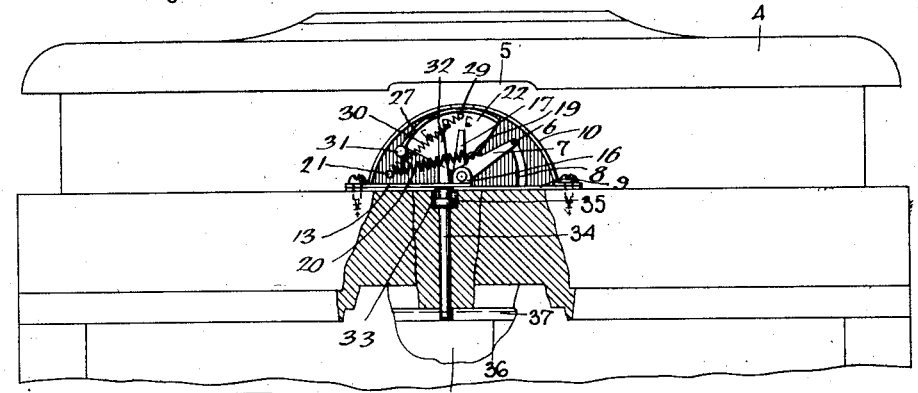
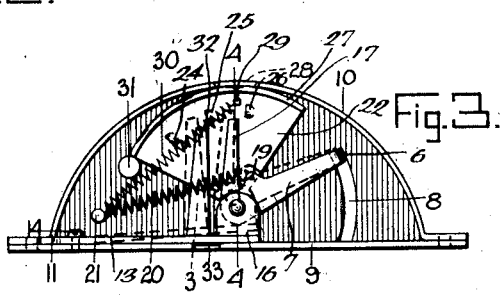
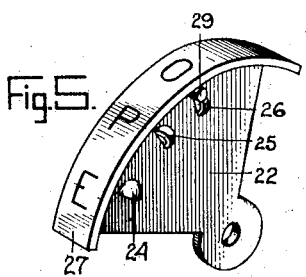
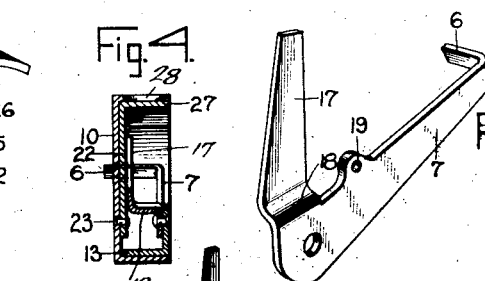
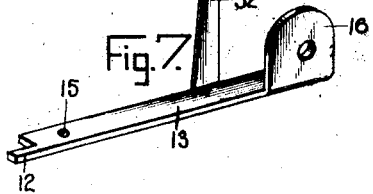
WITNESSES:
C. H. Reichenbach
A. L. Kitchin
INVENTORS
Charles R. Teige
Alfred L. Hart
BY Munn & Co
ATTORNEYS

UNITED STATES PATENT OFFICE.

CHARLES R. TEIGE, OF YONKERS, AND ALFRED L. HART, OF NEW YORK, N. Y.

AUTOMATIC INDICATOR FOR PLATE-HOLDERS.

1,143,462. Specification of Letters Patent. Patented June 15, 1915.

Application filed December 17, 1914. Serial No. 877,716.

*To all whom it may concern:*

Be it known that we, CHARLES R. TEIGE and ALFRED L. HART, both citizens of the United States, and residents, respectively, of Yonkers, in the county of Westchester and State of New York, and the city of New York, borough of Manhattan, in the county and State of New York, have invented a new and Improved Automatic Indicator for Plate-Holders, of which the following is a full, clear, and exact description.

This invention relates to improvements in indicating devices for photographic plate holders, and has for an object to provide an improved structure which will indicate the condition of the interior of the holder at all times so that the operator may know whether or not the holder contains one or more plates, and whether or not the plates have been exposed.

A further object in view is the provision of an indicating mechanism adapted to various forms of plate holders and operable by the slides of the holders so that the condition of the plate may be indicated, and also the condition of the holder, that is, whether the same is empty or full.

In the accompanying drawings—Figure 1 is a top plan view of the plate holder with an embodiment of the invention applied thereto; Fig. 2 is a front view of a plate holder with certain parts being broken away for disclosing the mechanism of the indicator connected therewith; Fig. 3 is a side view on an enlarged scale of an indicator embodying the invention; Fig. 4 is a section through Fig. 3 on line 4—4; Fig. 5 is an enlarged perspective view of an indicating segment forming part of the invention; Fig. 6 is an enlarged perspective view of an operating arm embodying certain features of the invention; Fig. 7 is an enlarged perspective view of a spring for supporting the structure shown in Figs. 5 and 6.

Referring to the accompanying drawings by numerals, 1 indicates a plate holder of any usual or preferred structure designed to receive a plate 2 on each face, which plates are covered by the slides 3 and 4 in the usual manner. The top of each of the slides 3 and 4 is provided with a cut-away portion 5 as shown in Fig. 2 so as to accommodate the projection 6 on lever 7. Projection 6 is intended to be engaged by the top of the slide at notch 5 and be forced downwardly to a position at the bottom of slot 8. This occurs each time the respective slides are inserted and removed. As there is provided an independent indicating mechanism for each side of the holder 1 a description of one will equally apply to both. The indicator (Fig. 3) is provided with a bottom 9 and a casing 10 which may be soldered or otherwise rigidly secured to the base 9 at any time. The casing 10 is notched at 11 for accommodating the extension 12 on the spring 13, which spring is held in place by a screw 14 passing through aperture 15 and engaging a suitable threaded opening in the base or bottom 9. The spring 13 is provided with an upstanding flange 16 to which is pivotally mounted the lever 7. Lever 7 is provided with an operating arm 17 slightly offset at 18 and an apertured projection 19 for receiving the end of retractile spring 20. The retractile spring 20 is connected at 21 by any suitable means to the casing 10 so that the lever 7 is continually urged to the position shown in Fig. 3. Coacting with the operating arm 17 is a segment 22 which is pivotally mounted at 23 on the casing 10, and which is provided with a plurality of stops 24, 25 and 26, the same being formed in any desired manner, as for instance by being pressed from the body of the segment. The periphery or outer edge of the segment is provided with a strip 27 on which is arranged suitable legends, as for instance, "O", "P" and "E" for indicating "Empty" "Plate" and "Exposure". The casing 10 is provided with an opening 28 through which the letters just mentioned may be seen as the same are brought opposite said opening. When the letter "O" appears opposite opening 28, the operator knows that the holder is empty, but when the letter "P" appears opposite opening 28 the operator knows that an un-exposed plate is in the holder. When the plate has been exposed the letter "E" will appear opposite opening 28. The segment 22 is also provided with a pin 29 to which spring 30 is secured, the opposite end of the spring being connected with the pin 21 so that the segment 22 will be continually urged to the position shown in Fig. 3, but cannot move beyond that position by reason of the stop 31 connected with the casing 10.

Formed integral with the spring 13 or rigidly secured thereto in any desired manner is an auxiliary stop 32 which is naturally raised and lowered with spring 13.

The lever 7 is also raised and lowered with spring 13 as the same is mounted on said spring. An aperture 33 is provided in the bottom of base 9 through which the end of pin 34 is adapted to pass. Pin 34 is provided with an enlargement 35 for preventing the passage of light into the holder and is made of such a length as to project into the space provided for plate 2. When the plate 2 has been moved up until the edge 36 is approximately at the dotted line 37, the free end of spring 13 will be raised so that the auxiliary stop 32 will be projected between the stops 24 and 25 on segment 22 and the arm 17 will be raised so as to project between the stops 25 and 26. The slide 14 is then placed in position for protecting the plate 2 in the usual manner. As slide 3 engages the extension 6 of lever 7 and moves the same downwardly, the arm 17 will engage stop 26 and move segment 22 until the auxiliary stop 32 snaps over the stop 24, the auxiliary stop 32 being formed of resilient material and capable of bowing sidewise or away from the segment 22 so as to easily snap over the stop 24 and prevent a reverse movement of the segment. The first insertion of the slide 4 will thus indicate that a plate is in the holder. When the holder is placed in the camera and the slide moved outwardly for allowing a proper exposure, the lever 7 will be released and arm 17 permitted to snap past the stop 25. When the slide 4 has been moved again into a closed position after the exposure, arm 17 will again actuate the segment 22 and move the same until the letter "E" is opposite opening 28. It will be noted that the segment 22 is operated only when there is a plate arranged properly in the holder. If there were no plate in the holder the insertion and removal of the slide would cause lever 7 to be moved back and forth, but would not cause a movement of segment 22 as the arm 17 and the stop 32 cannot engage the stops 24 to 26, inclusive, unless they are raised.

In forming the casing 10, preferably one side is left open though not necessarily. When one side is left open the casing is arranged as shown in Fig. 1 with the two open pieces together. This will necessitate the manufacture of only one style of casing and parts, as for instance what is known as a right. If both face the same way it will be necessary to manufacture a right and left. From Fig. 1 it will be observed that the extension 12 on one indicator is in one end of the casing and the extension 12 on the other indicator is at the opposite end of the casing. It will be of course evident that when the plate is removed from the holder the indicating mechanism will resume or return to its former position automatically. This is caused by the fact that when the plate is removed spring 13 and the parts connected therewith will be lowered and consequently will be moved out of engagement with the segment 22, whereby spring 30 will automatically move the segment back to its former position and show that the holder is empty.

What we claim is—

1. In an indicator for photographic plate holders, a movable member provided with legends describing the condition of the plate in the holder, a lever provided with an operating member adapted to engage and move said movable member for bringing to view the various legends thereon, and a projecting arm formed with an extension arranged in the path of movement of the slide forming part of said holder, whereby whenever the slide is operated said movable member will be advanced, and means for automatically returning said movable member back to its original position when the plate in the holder is removed.

2. In an indicator for plate holders of the character described, a pin operable by a plate arranged in said holder, a pivotally mounted lever displaced by said pin, said lever being formed with a projection, a pivotally mounted segment engaged by the projection on said lever so as to be moved thereby, and a stop for preventing a reverse movement, said segment being provided with indicating legends disclosing the condition of the interior of the holder.

3. An indicator for photographic plate holders comprising a casing formed with an opening, a pivotally mounted segment having legends arranged thereon adapted to be brought opposite said opening, a lever for actuating said segment, said lever having an extension arranged with a projection extending into the path of movement of the slide of the plate holder, and a stop for preventing a reverse movement of the segment.

4. In an indicator for photographic plate holders, a reciprocating pin adapted to be moved by a plate when positioned in the holder, a spring raised by said pin, a pivotally mounted lever arranged on said spring and raised thereby when said spring is raised, said lever being formed with an operating extension and a projecting arm, said extension being designed to be engaged by a slide on said holder and said lever operated thereby when the slide is closed, a pivotally mounted segment having a plurality of stops arranged thereon, said stops being adapted to be engaged successively by said arm, whereby said segment is moved forwardly upon the opening and closing of said slide, a stop for preventing a reverse movement of said segmental member, said segmental member being formed with indications on the face thereof, and a casing formed with an opening for disclosing to view said indications as said segmental member is moved.

5. In an indicator for photographic plate holders, a pin adapted to be raised by a plate, when being positioned in said holder, a pivotally mounted arm and a stop raised by said pin, means extending from said arm operated by a slide on said holder for moving said arm in one direction, a spring for moving said arm in the opposite direction when released, and a pivotally mounted segment moved by said arm in one direction and prevented a reverse movement by said stop, said segment having legends thereon for disclosing the condition of a plate in the holder.

In testimony whereof we have signed our names to this specification in the presence of two subscribing witnesses.

CHARLES R. TEIGE.
ALFRED L. HART.

Witnesses:
A. L. KITCHIN,
PHILIP D. ROLLHAUS.